June 12, 1951     A. H. JORDAN     2,556,812
STRIP CHART GUIDE
Filed Dec. 13, 1947
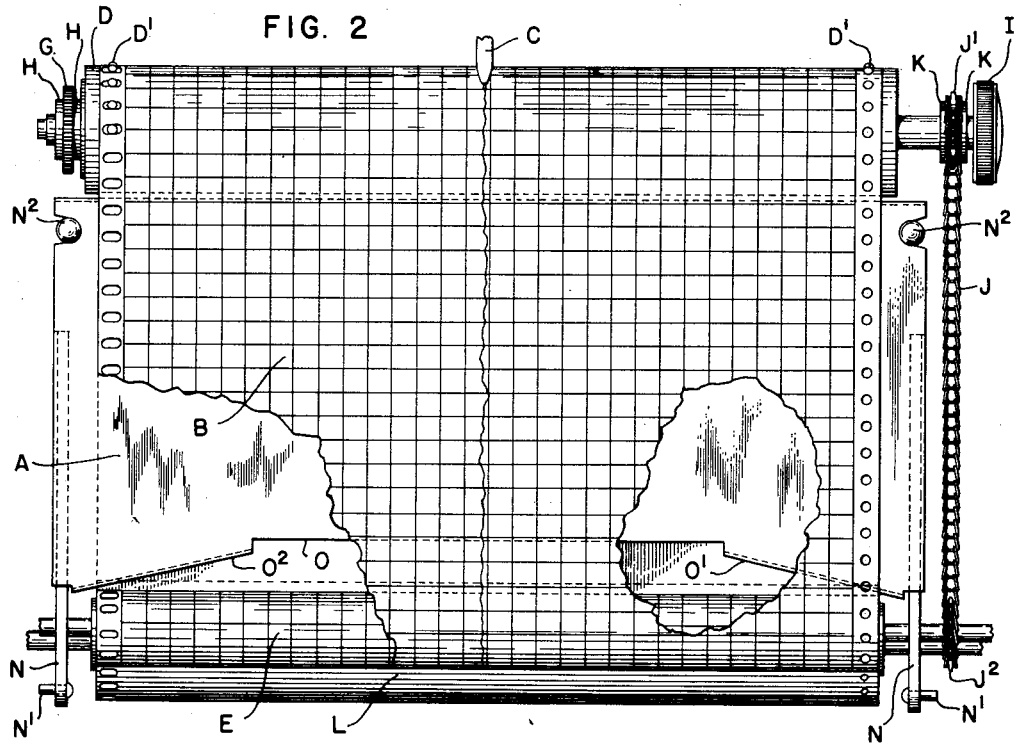
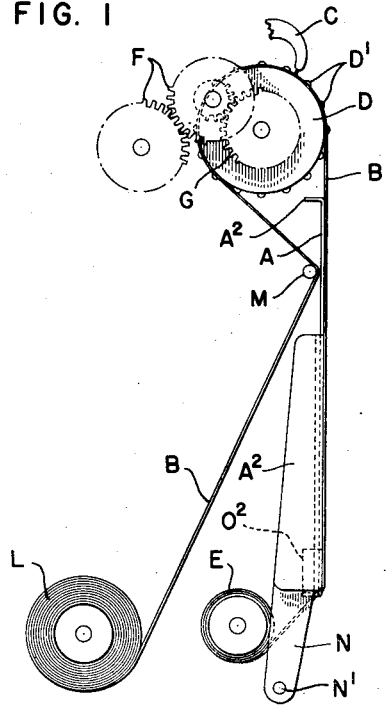
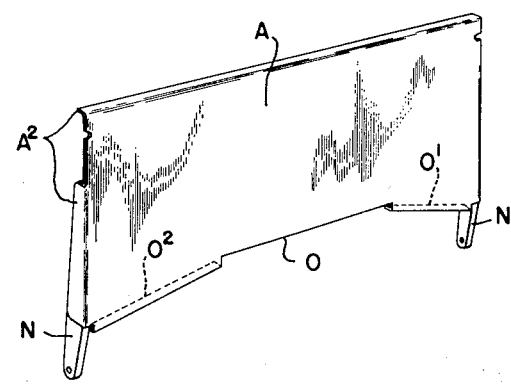
INVENTOR.
ARTHUR H. JORDAN
BY Arthur H. Swanson
ATTORNEY.

Patented June 12, 1951

2,556,812

UNITED STATES PATENT OFFICE 2,556,812

STRIP CHART GUIDE

Arthur H. Jordan, Norristown, Pa., assignor, by mesne assignments, to Minneapolis-Honeywell Regulator Company, Minneapolis, Minn., a corporation of Delaware Application December 13, 1947, Serial No. 791,516

1 Claim. (Cl. 271—2.6)

The present invention relates to means for advancing a strip chart in the form of an elongated strip of flexible material which is ordinarily paper, such as is used in many measuring and recording instruments, over chart guiding means customarily including a chart plate, one face of which supports and guides the chart as the latter is being longitudinally advanced while marking means are making a record on the chart and more or less of which is in front of the chart plate in position for visual inspection.

The general object of the present invention is to provide simple and effective means for substantially eliminating the objectionable tendency, heretofore experienced, of a strip chart to move laterally away from its normal or desired path of longitudinal chart movement, first in one direction and then in the opposite direction. The tendency of the chart to such weaving motion, or lateral movements alternately in opposite directions, is apparently due to fluctuations in the tensions to which the side edge portions of the chart material is subjected.

A more specific object of the present invention is to provide a chart plate so disposed and having an end portion so shaped as to subject each side edge portion of the chart to a tension which is normally greater than that to which the central portion of the chart is subjected and to rapidly increase the tension of the edge portion of the chart which leads each lateral or weaving movement of the chart, while simultaneously reducing the tension of the other or trailing side edge portion of the chart.

The portion of the chart strip moving over the face of the chart plate is normally under tension which holds the chart material taut and in suitably snug engagement with the face of the chart plate. The tension of the chart strip moving over the chart plate face is ordinarily due either to a chart feeding drum or roll drawing the chart over the face of the chart plate, or to a take-up roll or re-roll element which draws the chart material away from a feed roll or drum at the opposite end of the chart plate over the chart plate face. In either case, difficulty has heretofore been experienced because of the tendency of the tension of each side edge portion of the chart strip to vary so that it alternately exceeds and falls below the tension of the other side edge portion. When the two side edge portions of the chart are under different tensions, the longitudinal movement of the chart is attended by a small lateral movement of the chart. One result of each lateral movement of the chart in one direction appears to be a gradual reduction in the tension of the side edge of the chart which leads the lateral movement and had the higher tension when the corresponding lateral motion was initiated. That tension reduction continues until the tension of the last mentioned side edge is lower than the tension of the other side edge with a reversal in the direction of the lateral chart movement.

The various features of novelty which characterize my invention are pointed out with particularity in the claim annexed to and forming a part of this specification. For a better understanding of the invention, however, its advantages, and specific objects attained with its use, reference should be had to the accompanying drawing and descriptive matter in which I have illustrated and described a preferred embodiment of the invention.

Of the drawings:

Fig. 1 is a somewhat diagrammatic side elevation of a portion of a recording instrument;

Fig. 2 is a somewhat diagrammatic front elevation of the apparatus shown in Fig. 1; and Fig. 3 is a perspective view of the chart plate shown in Figs. 1 and 2.

By way of example, I have illustrated the use of the invention in a recording instrument of known type comprising a chart plate A, the front face of which forms a smooth flat supporting surface for a portion of a strip chart B on which a record has been made by recording means C. In the particular arrangement shown in the drawings, the portion of the chart B alongside the front face of the plate A extends between a chart drum or feed roll D and a take-up roll or re-roll element E. The latter subjects the portion of the chart in front of the plate A to tension and maintains it in contact with the face of the plate. As shown, the chart drum D is provided with sprocket pins D' at its ends to enter perforations formed for the purpose in the edge portions of the chart B. In operation the drum D is slowly rotated by a clock motor, not shown, through a driving connection shown diagrammatically as a gear train F including a drum driving gear G mounted on the shaft of the drum D. The gear G is advantageously connected to the drum D through a friction clutch H normally effective to cause the drum D to turn with the driving gear G, but permitting the manual rotation of the drum D without a corresponding rotation of the gear G, through a knob I carried by the drum shaft, when such drum rotation is needed to position the chart relative to the recording means for time calibrating or other purposes, as is common in the recording instrument art.

As shown, the rotation of the drum D effects rotation of the take-up roll E through a sprocket chain J which runs over a driving sprocket wheel J' mounted on the shaft of the drum D, and a sprocket wheel J² mounted on and secured to the shaft of the take-up roll E. As shown, the sprocket wheel J' is connected to the shaft of the drum D by a friction clutch K. The sprocket wheel J' is sufficiently larger in diameter than the sprocket wheel J² to require a continuous slippage of the wheel J' on the shaft of the drum D. The friction clutch K serves the purpose of maintaining the portion of the strip chart B between the feed drum D and take-up roll E under a substantially constant tension, while permitting the angular speed of the roll E relative to that of the drum D, to diminish as the amount of chart material wound on the roll E progressively increases. The drum D draws strip chart material B away from a supply roll L over a guide bar M so disposed that the chart is in contact with the feed drum D over an arc somewhat greater than 180°. The supply roll L is advantageously subjected to a retarding or braking force, as by means of a frictional retarding element (not shown) at the end of the roll, to prevent intermittent overtravel of the chart material. In normal operation, the feed drum is rotated at a constant speed and thus insures a correspondingly constant speed of travel of the chart B, notwithstanding the tendency of the supply roll to slow down, and the tendency of the take-up roll E to speed up the chart travel.

As shown in Fig. 1, the plane of the front face of the chart plate A is substantially tangential to the periphery of the feed drum D, and the take-up roll E is laterally displaced to the rear of said plane. In consequence, the portion of the strip chart between the drum D and take-up roll E is snugly held against the front face of the chart plate A by the longitudinal tension to which the chart material engaging said face is subjected by the take-up roll E.

As shown, the body portion of the chart plate A, is in the form of a flat metal sheet having transversely bent edge portions which form transversely extending stiffening flanges giving additional strength and rigidity to the chart plate structure, and bars forming depending extensions or legs N are rigidly secured to the chart plate at its side edges as by brazing or welding. The lower ends of the legs N are connected by pintels N' to the framework of the recording instrument so that the chart plate may be tipped forward to permit a supply roll L to be inserted or removed in the instrument from the front of of the latter. The upper corners of the chart plate may be detachably secured to the instrument framework by clamping or locking parts N².

Insofar as already described in detail, the apparatus shown in the drawing is like that included in the self-balancing recording potentiometer of the known type and form disclosed in the Caldwell patent, 2,423,480 of July 8, 1947. However, as those skilled in the art will understand, the invention disclosed and claimed herein may be used with advantage in recording apparatus differing widely in type and form from that shown in said patent.

In accordance with the present invention, the end of the chart plate body remote from the feed drum D, is notched or cut away to form an intermediate central edge portion O, and side edge portions O' and O² diverging away from the central portion O in opposite directions at an angle to the general direction of chart movement over the chart plate which is not sharply critical, but which may well be about 88°. The inclination of each of the edges O' and O² to the direction of chart movement over the chart face, is such that the outer end of the edge is farther away than the inner end from the portion of the chart plate face between its ends and transverse to the path of the chart strip over the face. Thus, as will be apparent, the shaping and disposition of the chart plate relative to the take-up roll E is such as to normally subject each side edge portion of the chart strip to a longitudinal tension greater than that to which the central portion of the chart strip is subjected.

Furthermore, any tendency to lateral movement of the portion of the chart strip between the feed drum D and take-up roll E results in a sharp increase in the tension of the side edge portion of the chart which leads the lateral movement of said chart portion, and a decrease in the tension of the other side edge portion of the chart. Thus, as seen in Fig. 2, a lateral movement to the right from its normal position of the chart strip portion engaging the chart plate edges O' and O² causes the right hand edge of the chart strip to engage the chart plate edge O' at a distance from the feed drum D greater than that at which the chart plate edge O² is engaged by the left hand edge of the chart strip. As a result, the movement of the chart strip to the right increases the tension of the right hand edge of the chart strip relative to the tension of the left hand edge of the strip.

Conversely, a movement of the chart strip to the left from its neutral position, as seen in Fig. 2, increases the tension of the left hand edge portion of the chart strip relative to the tension of the right hand edge portion, and the chart strip is thereby given a definite tendency to movement to the right along the oppositely inclined chart plate edges O² and O'. On any lateral movement of the chart strip away from its normal position, the resultant change in the relative tensions of the two side edge portions of the chart tends to produce a reverse lateral chart movement and thus return the chart to its normal position in which the two side edges of the chart are under equal tension.

While in accordance with the provisions of the statutes, I have illustrated and described the best form of embodiment of my invention now known to me, it will be apparent to those skilled in the art that changes may be made in the form of the apparatus disclosed without departing from the spirit of my invention as set forth in the appended claim, and that in some cases certain features of my invention may be used to advantage without a corresponding use of other features.

Having now described my invention, what I claim as new and desire to secure by Letters Patent, is:

A chart guide for use in a strip chart recorder and comprising a metal plate shaped to provide a flat face for engagement by a strip chart drawn over said face toward one end of the latter and formed at said end with a central edge portion transverse to the direction of chart movement over said face and with a separate edge portion at each side of said central edge portion, said separate edge portions being oppositely inclined to diverge away from a straight line extending between the adjacent ends of said separate edge portions in the direction of chart movement over said face, whereby said separate edge portions tend to prevent lateral movement of the strip chart moving over said face when the chart is deflected to the rear of said face as it moves away from said one end thereof.

ARTHUR H. JORDAN.

REFERENCES CITED

The following references are of record in the file of this patent:

UNITED STATES PATENTS

| Number | Name | Date |
|---|---|---|
| 169,573 | Parr | Nov. 2, 1875 |
| 878,815 | Martin | Feb. 11, 1908 |
| 2,034,543 | Twiss et al. | Mar. 17, 1936 |
| 2,095,733 | Coryell | Oct. 12, 1937 |
| 2,423,480 | Caldwell | July 8, 1947 |